(12) United States Patent
Clifford

(10) Patent No.: US 8,122,978 B1
(45) Date of Patent: Feb. 28, 2012

(54) DRILLING DEVICE WITH UNDERCUTTING

(76) Inventor: John Clifford, Chestnut Hill, MA (US)

(*) Notice: Subject to any disclaimer, the term of this patent is extended or adjusted under 35 U.S.C. 154(b) by 338 days.

(21) Appl. No.: 12/387,588

(22) Filed: May 5, 2009

(51) Int. Cl.
*B23B 51/00* (2006.01)

(52) U.S. Cl. ........... 175/284; 408/180; 408/224; 82/1.2; 175/286

(58) Field of Classification Search .......... 30/103, 30/108; 82/1.5; 166/259, 279, 281; 175/158, 175/202, 284, 286, 288; 405/259.1; 408/124, 408/145, 153, 159, 180, 188; 606/53, 83
See application file for complete search history.

(56) References Cited

U.S. PATENT DOCUMENTS

| | | | | |
|---|---|---|---|---|
| 1,369,959 | A * | 3/1921 | Booker | 175/290 |
| 1,858,926 | A * | 5/1932 | Grau et al. | 175/286 |
| 4,010,807 | A | 3/1977 | Fischer | |
| 4,307,636 | A | 12/1981 | Lacey | |
| 4,401,172 | A | 8/1983 | Kessler | |
| 4,403,636 | A * | 9/1983 | Lopez | 383/107 |
| 4,411,324 | A | 10/1983 | Liebig | |
| 4,467,879 | A * | 8/1984 | Burge | 175/325.4 |
| 4,497,383 | A | 2/1985 | Ostertag | |
| 4,586,573 | A * | 5/1986 | Jones | 175/285 |
| 4,989,681 | A | 2/1991 | Lohmuller et al. | |
| 4,998,981 | A | 3/1991 | Miyanaga | |
| 7,179,024 | B2 | 2/2007 | Greenhalgh | |
| 2004/0105734 | A1 * | 6/2004 | Yekutiely et al. | 411/55 |
| 2005/0260046 | A1 * | 11/2005 | Hecht et al. | 408/31 |
| 2008/0038068 | A1 * | 2/2008 | Craig | 405/259.3 |

* cited by examiner

*Primary Examiner* — Shane Bomar
*Assistant Examiner* — Oleg V Merkoulov
(74) *Attorney, Agent, or Firm* — Stan Collier, Esq.

(57) ABSTRACT

The invention is a drilling device for providing a conically shaped cavity in materials primarily used for anchoring systems. The drilling device is comprised of a solid shank for attachment to a drill, a reverse thread section, and a cutting head. The cutting head includes a cutting tip, clean out flutes, extendable cutting blades mounted within an internal chamber of cutting head body, and means for extending the cutting blades. The extendable cutting blades project from the cutting head body radially when the reverse thread section is driven into the internal chamber of the cutting head. The reverse thread section interacts with the means for extending the cutting blades. This may include a pair of cams that are spring biased outwardly. The cams push against the backsides of the extendable cutting blades for driving them from the cutting head body when the drill device is counter rotated. The extendable blades cut a conical cavity at the distal end of a bore hole made by the cutting tip of the cutting head. After the conical cavity is produced, the drilling device is then clockwise rotated to cause the reverse threaded section being at its most distal position to return to its initial position. Biased springs mounted on the outer part of the body push the cutting blades into the body so that the drilling device can be removed from the bore hole.

6 Claims, 4 Drawing Sheets

DRILLING DEVICE WITH UNDERCUTTING

CROSS REFERENCES TO RELATED APPLICATIONS

NA

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

1. Field of the Invention

The present invention relates generally to drilling devices, and, particularly, relates to drilling devices for providing increased anchorage, and, in greater particularly, relates to drilling devices for providing a conical anchorage cavity in a bore hole.

2. Description of the Prior Art

The need for anchoring objects to other surfaces is well known. The material of the substrate may be plastic, wood, bone, concrete, metal, for example, and thus require any anchoring system that is acceptable to many materials. Some materials are brittle and are not able to be threaded by a tap such as concrete and thus the bore hole must be otherwise modified to hold an anchoring system. An anchor bolt may be glued into the bore hole, but this may not be sufficient to hold significant loads under stressful conditions and quickly result in catastrophic failure. The use of anchor bolts with expanding walls is also well known, but again, under stressful conditions such as high vibrations even these may result in loosening of the anchor and eventual failure. A more positive solution to this problem is the modification of the bore hole by undercutting the wall.

This problem is addressed in prior patents. For example, one patent discloses an internal cam shaft for rotating a cutting blade into the substrate to produce an undercut portion. Another embodiment shows an expanding balloon held by an internal shaft to push out a pivoted blade. These require modifications to the drill. Another embodiment shows a cantilevered cutting blade which deploys upon a change in the rotation of the drill. There is no external control over the cutting blade itself and further there is no way of removing debris that is created when rotating the drill counter to its normal flute direction which may result in clogging of the cutting blade, breaking of the cutting blade and jamming of the drill in the hole upon an attempted removal. Another patent discloses a drill bit having means for undercutting being extendable fingers running along the shank of the drill. A guide sleeve mounted to the shank operates to extend the fingers when coming into contact with the surface of the workpiece. The number of moving parts would thus expose this drill bit to jamming considering its use in concrete undercutting for example.

Several patents disclose undercutting drill bits having fixed lateral cutting blades. One type requires that the drill shank be rocked laterally to cause the enlargement of the hole and another discloses the undercutting head being smaller than the diameter of the actual bore hole. These are specialized undercutting tools without the traditional drill bit for making of the bore hole thus requiring multiple insertions and removals to achieve an anchor cavity. Other patents disclosure undercutting bits having blades that are deployable by means of spring biased shafts.

Accordingly, there is an established need for a combined drilling device having cutting blades for undercutting, flutes for removing debris, and a minimum of moving parts that provides these features.

BRIEF SUMMARY OF THE INVENTION

The present invention is directed at a drilling device for making a bore hole and for undercutting a portion of the bore hole for use in an anchoring system.

Embodiments of the present invention provide a drilling device for establishing a conically shaped cavity in materials primarily used for anchoring systems. The drilling device is comprised of a solid shank for attachment to a drill, a reverse threaded section, and a cutting head. The cutting head includes a cutting tip, clean out flutes, extendable cutting blades mounted within an internal chamber of cutting head body, and means for extending and returning the cutting blades. The extendable cutting blades project from the cutting head body radially when the reverse threaded section is driven into the internal chamber of the cutting head. The reverse threaded section interacts with the means for extending the cutting blades. This may include a pair of cams that are spring biased outwardly. The cams push against the slanted backsides of the extendable cutting blades for driving them from the cutting head body when the drill device is counter rotated. The extendable blades cut a conical cavity at the distal end of a bore hole made by the cutting tip of the cutting head. After the conical cavity is produced, the drilling device is then clockwise rotated to cause the reverse threaded section being at its most distal position to return to its initial position. Biased springs mounted on the outer part of the body push the cutting blades into the body so that the drilling device can be removed from the bore hole.

A feature of the present embodiment is to provide a means undercutting a bore hole.

It is another feature of the present invention to provide a drilling device capable of drilling a bore hole as well as undercutting the bore hole.

It is a further feature of the present invention to provide a drilling device usable with a conventional drill.

It is still a further feature of the present invention to provide a drilling device that operates by changing the direction of rotation of the drilling device.

It is yet a further feature of the present invention to provide a drilling device that is able to remove debris irrespective of the direction of rotation of the cutting head and minimizes the number of moving parts.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE INVENTION

The present invention is directed at a drilling device for providing increased anchorage by providing a conically shaped anchorage cavity in a bore hole.

Figure 1:
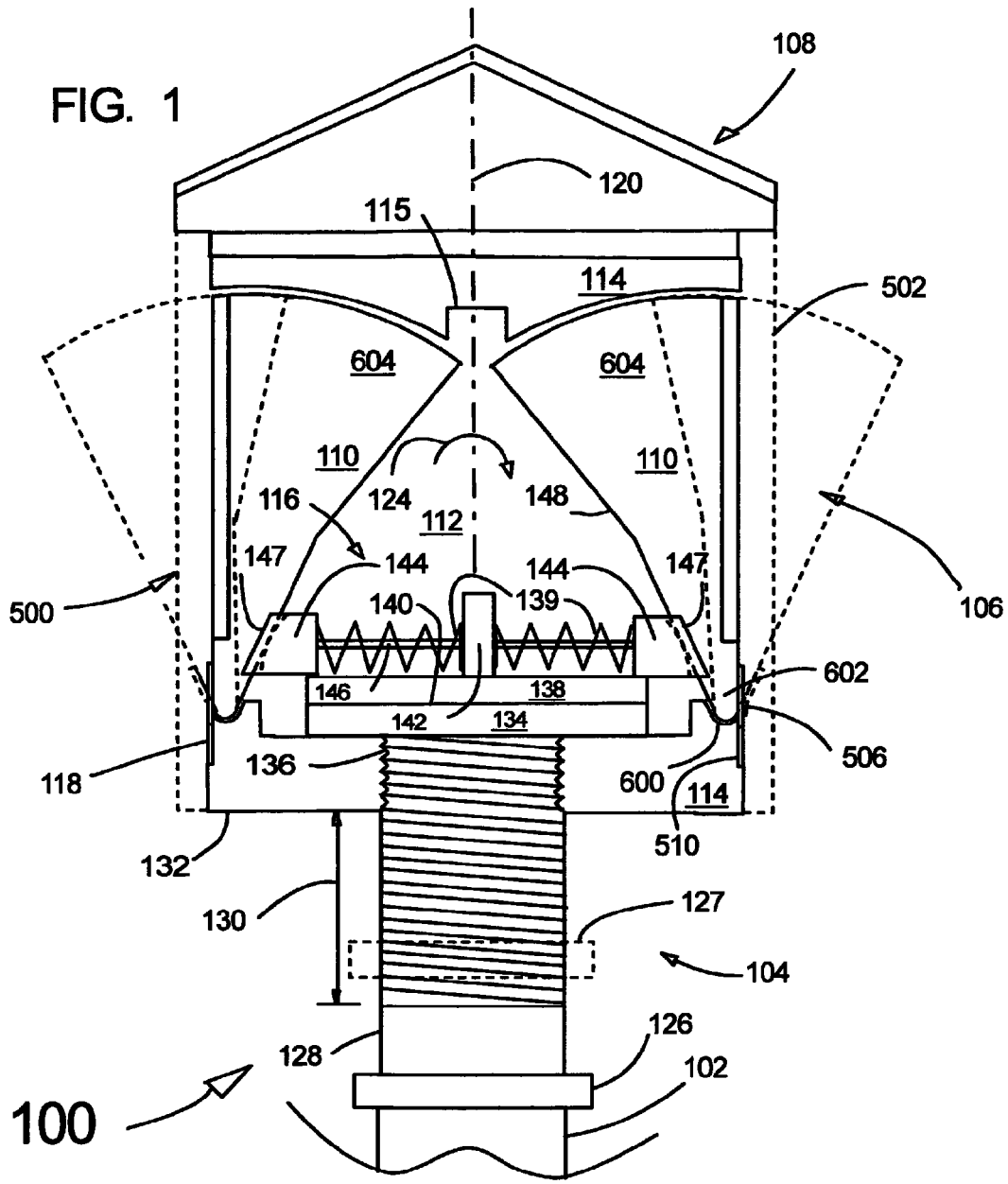
FIG. 1 is a cross sectional view of one embodiment of the present invention of a drilling device with an undercutting means.
Figure 4:
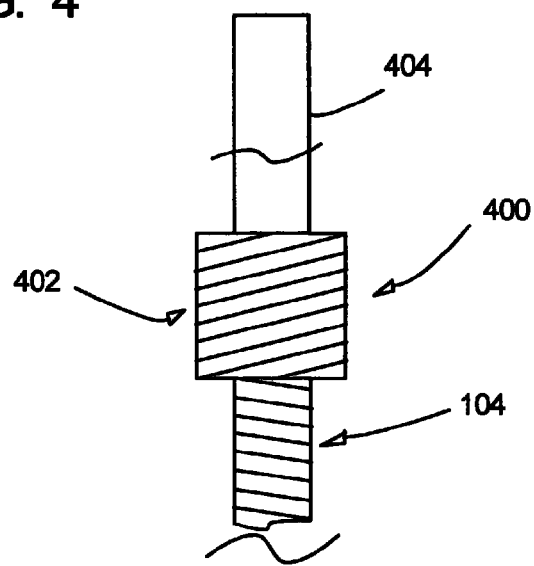
FIG. 4 is a side view of the shank having a threaded section for attachment to an anchoring system.

As best shown in FIG. 1, generally, the invention is a drilling device 100 for providing a conically shaped cavity 200, FIG. 4, in a substrate 202 primarily used for anchoring systems, not shown. A base of the conically shaped cavity 204 is located at the distal end of the bore hole 206. The drilling device 100 is comprised of a solid shank 102 for attachment to a drill, not shown, a reverse threaded section 104, and a cutting head 106. The cutting head 106 includes a cutting tip 108, clean out flutes 502, FIG. 5, a pair of extendable cutting blades 110 mounted within an internal chamber 112 of a cutting head body 114, and means 116 for extending the cutting blades 110 and means 118 for returning the cutting blades. The extendable cutting blades 110 project from the cutting head body 114, shown in outline, radially when the reverse threaded section 104 is driven into the internal chamber 112 of the cutting head 106. The reverse threaded section 104 interacts with the means 116 for extending the cutting blades 110. The drilling device 100 rotates about an axis 120. An arrow 124 shows a clockwise rotation about the axis 120. It should be understood that drills conventionally turn clockwise when drilling into materials as viewed from the drill shank end, but this may be changed. In the present invention a counter rotation to the drilling is required to properly operate the drilling device 100.

It is well known that drill bits come in a variety of configurations. Technical aspects such as the spiral flute rate, the point angle of the tip, the lip angle of the cutting edges, the length, the diameter, and metal composition may be adjusted. Although the present invention is directed at undercutting for the purpose of an anchoring system, undercutting can be used for other purposes.

The shank 102 may be of a predetermined length and made of conventional material used in drill manufacturing. Placed about the shank 102 is an adjustable collar 126 that is used to determine the depth of penetration of the drill tip 108 into the substrate 202. The proximal end of the shank 102 is attached to the drill and the distal end 128 is fixedly attached to the reverse threaded section 104. As seen in FIG. 1, the reverse threaded section 104 is in its initial position extending from the cutting head 106 a distance 130 measured from a bottom 132 of the cutting head body 114 to the end of the threaded section. The distance 130 would correspond approximately to the distance traveled by the means 116 for extending the cutting blades from the vertical axis 120. Alternatively, the top of the central support 142 may be of a length to stop in a cavity 115 when the cutting blades 110 are fully extended. In another embodiment, a threaded stop 127 may be mounted to the threaded section 104 and adjusted to control the degree of extending the cutting blades 110 from the device 100. In the initial position, the cutting blades 110 are not extended from the body 114 and are shown by solid lines.

A stop support 134 on the distal end 136 of the reverse threaded section 104 prevents the removal of the reverse threaded section 104 from the cutting head body 114. A counter clockwise rotation of the reverse threaded section 104 will cause the section 104 to be screwed further into the cutting head 106 for the purpose of extending the cutting blades 110. Through the application, threads are shown as parallel lines and it is understood that conventional threads are used herein as appropriately noted.

As seen in FIG. 1, one embodiment of the means 116 for extending the cutting blades 110 is shown. A base 138 is positioned on a top 140 of the stop support 134. A central support 142 is fixedly attached to the base 138. A pair of cams 144 are mounted to axles 146 having biasing springs 139 that push the cams 144 into the cutting blades 110. The cams 144 have grooved faces 147 that ride upon upwardly slanting backsides 148 of the cutting blades 110. As the reverse threaded section 104 is screwed into the internal chamber 112, the means 116 is pushed upwards causing the cutting blades 110 to extend from the body 114 as will be shown hereinafter. It should be understood that the internal chamber 112 may lubricated with grease to prevent the entrance of dust and other debris that may jam or clog this device.

Figure 3:
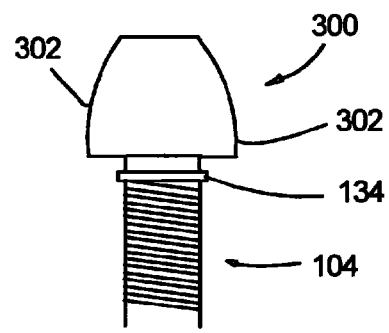
FIG. 3 is a side view of another embodiment of the means for extending the cutting blades of the present invention.

FIG. 3 illustrates by side view another embodiment of the means 116. As seen therein, the stop support 134 has a conical cam 300 fixedly mounted thereto. As the reversed threaded section 104 is moved into the internal chamber 112, sides 302 of cam 300 push against the back sides 148 of the cutting blades 110.

FIG. 4 illustrates a shank 400 of a drilling device 100 wherein the drilling device 100 remains in the bore hole 206 for attaching a support member, not shown, to a threaded section 402 with a portion of the reverse threaded section 104 following. The upper part 404 of the shank 400 is of a smaller diameter than the threaded section 402 so that a threaded adaptor, not shown, of an anchor system can be attached thereto. It thus should be understood that the drilling device of the present invention would remain secured in the bore hole and not removed in one aspect of the present invention.

Figure 5:
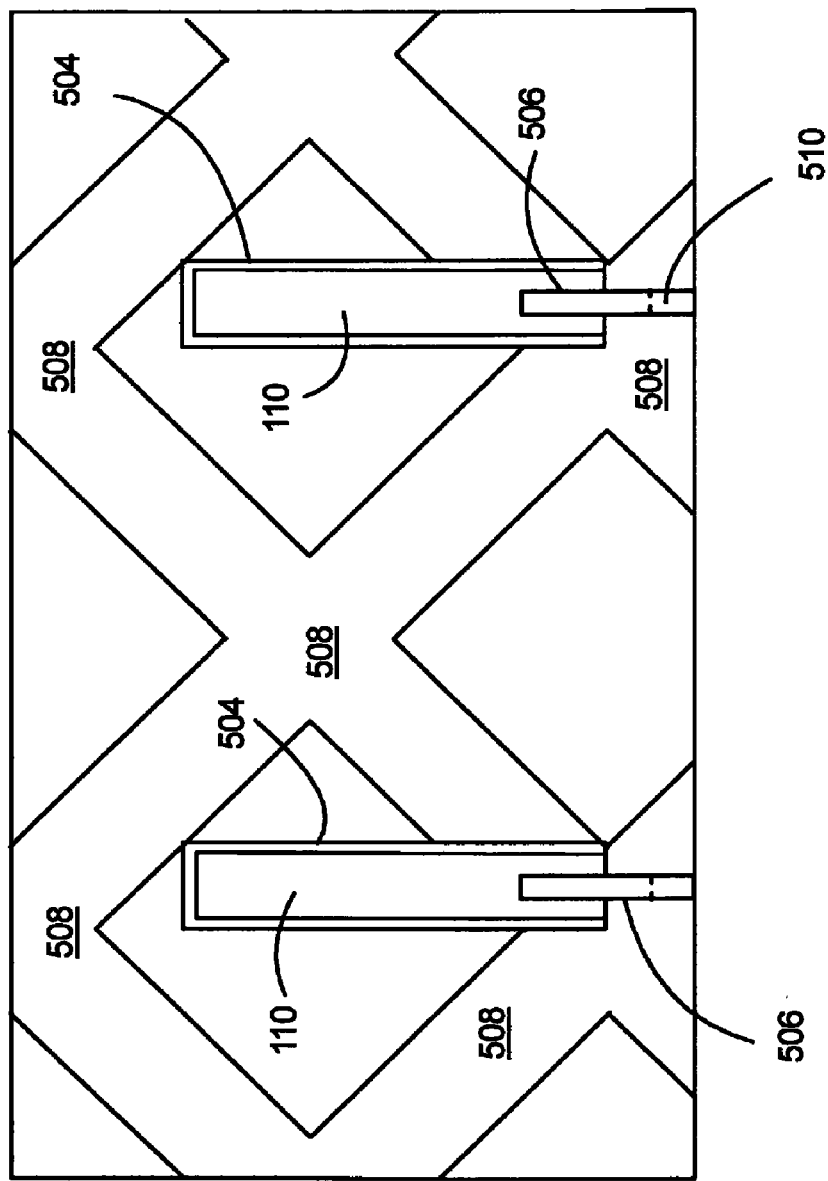
FIG. 5 is a cylindrical projection of the side of the body of the cutting head showing the clean out flutes, apertures for cutting blades, and spring biased means for returning the cutting blades of the present invention.

FIG. 5 is a cylindrical projection, a two dimensional view, of a side 500 of the cutting head 106, a three dimensional shape, of the body 114 showing the clean out flutes 502, apertures 504 for cutting blades 110, and spring biased means 506 for returning the cutting blades 110 to inside of the internal chamber 112 of the present invention. The clean out flutes 502 are bi-directional in cleaning of debris from the cutting head 106 in that they are both clockwise and counter clockwise located on the side 500 producing a plurality of channels 508 crossing one another. The extendable cutting blades 110 are pushed out through the apertures 504. Each aperture 504 has a biased metal finger or biased spring means 506 located at the bottom thereof so that the cutting blades 110 would be urged back into the internal chamber when the reverse threaded section 104 is removed from the internal chamber 112. The bottom 510 of each finger 506 is weld into the body 114.

Figure 6A:
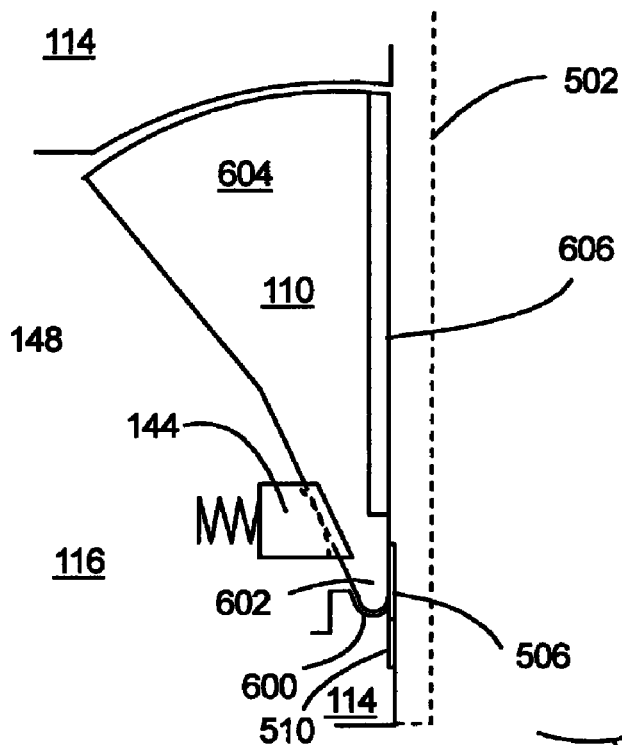
FIGS. 6A and 6B illustrate by side view the mounting of the cutting blades in the cutting head.
Figure 6B:
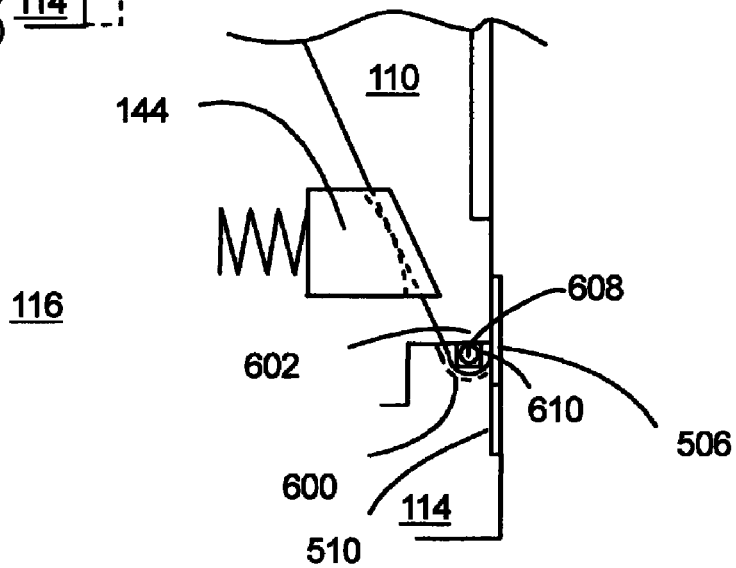

FIG. 6A shows a cutting blade 110 pivotally mounted within the body 114 of the cutting head 106. The cutting blade 110 has a bottom curved section 602 that is pivotally fitted within a cup 600. As the cam 144 is pushed up the upward slanting backside 148, an upper section 604 is pushed outward so that a cutting edge 606 is exposed to the substrate 202. The cutting edge 606 may be designed for different substrates 202 such as concrete, wood, etc. FIG. 6B shows a pin 608 mounted in the bottom 602 of the cutting blade 110 and being positioned within a slotted holder 610. In either embodiment, the blades 110 may be inserted into the cutting head 106 through the apertures 504 during assembly.

Figure 2:
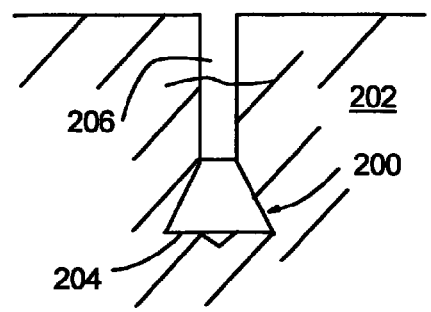
FIG. 2 is a cross section through a substrate into which a bore hole is placed showing a conical cavity at the bottom on the bore hole.

In using the present invention to provide the shaped cavity 200 in the bore hole 206, the drilling device 100 is attached to a drill having a reversible drive. The bore hole 206, FIG. 2, is cut into the substrate 202 with a clockwise rotation of the drilling device 100, FIG. 1, until a stop 126 is reached; and at that position, the drill is reversed in rotation to form the shaped cavity 200 in the bore hole 206 with a counter clockwise rotation. If the drilling device 100 is to be removed from the bore hole 206, the drill is reversed in the rotation, again, to withdraw the cutting blades 110 into the body 114 of the cutting head 106.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A drilling device for providing a shaped cavity in a bore hole, said drilling device comprising: a shank for attachment to a drill; a reverse threaded section, said reverse threaded section attached to said shank;
   a cutting head, said cutting head rotatably attached to said reverse threaded section, said cutting head having extendable cutting blades for providing the shaped cavity, said cutting head further having a cutting tip thereon for boring the bore hole, wherein said cutting head comprises a substantially cylindrical body having an internal chamber therein with a cutting tip located at a top of said cylindrical body;
   a plurality of clean out flutes located on a side of said cylindrical body, said plurality of clean out flutes being bi-directional in cleaning of debris from said cutting head;
   said extendable cutting blades mounted within said internal chamber of said cutting head body; and means for extending said cutting blades through said side of said body.

2. The drilling device as defined in claim 1, wherein said extendable cutting blades project from said cutting head body radially when said reverse threaded section is driven into said internal chamber of said cutting head.

3. The drilling device as defined in claim 2, wherein said reverse threaded section interacts with said means for extending said extendable cutting blades.

4. The drilling device as defined in claim 1, wherein said means for extending said extendable cutting blades comprises:
   a shaped cam mounted to a distal end of said reverse threaded section, as the reverse threaded section is screwed into the cutting head, the shaped cam is forced against upward slanting back sides of said extendable cutting blades to drive said extendable cutting them from openings in said side of said body.

5. The drilling device as defined in claim 1, wherein said means for extending the cutting blades comprises:
   a base, said base rotatably mounted to said distal end of said reverse threaded section within said internal chamber of said body of said cutting head, said base being perpendicular to the axis of rotation of said drilling device;
   a pair of spring biased cams, said pair of spring biased cams mounted to said base, said cams being in guided contact with upwardly slanting back sides of said extendable cutting blades, wherein as said reverse threaded section is screwed into said body, said base with said cams thereon is forced to translate along the axis of rotation in the direction of said cutting tip of said cutting head, whereupon, said extendable cutting blades are forced from said body.

6. The drilling device as defined in claim 5, wherein said extendable cutting blades are pivotally mounted within said body of said cutting head and biased inwardly to the axis of rotation.

\* \* \* \* \*